United States Patent
Gerard

(10) Patent No.: US 9,962,860 B2
(45) Date of Patent: May 8, 2018

(54) PLASTICS PROCESSING ROLL, PLASTIC FILM PROCESSING DEVICE AND METHOD FOR PRODUCING DOUBLE-SIDED STRUCTURED PLASTIC FILMS

(71) Applicant: RENOLIT SE, Worms (DE)

(72) Inventor: Yannick Gerard, Ohain (BE)

(73) Assignee: RENOLIT SE, Worms (DE)

( * ) Notice: Subject to any disclaimer, the term of this patent is extended or adjusted under 35 U.S.C. 154(b) by 0 days. days.

(21) Appl. No.: 14/917,987

(22) PCT Filed: Sep. 8, 2014

(86) PCT No.: PCT/EP2014/002429
§ 371 (c)(1),
(2) Date: Mar. 10, 2016

(87) PCT Pub. No.: WO2015/036110
PCT Pub. Date: Mar. 19, 2015

(65) Prior Publication Data
US 2016/0221226 A1 Aug. 4, 2016

(30) Foreign Application Priority Data

Sep. 10, 2013 (EP) .................................... 13004400

(51) Int. Cl.
*B29C 59/04* (2006.01)
*B29C 43/46* (2006.01)
(Continued)

(52) U.S. Cl.
CPC .......... *B29C 33/044* (2013.01); *B29C 33/424* (2013.01); *B29C 59/04* (2013.01);
(Continued)

(58) Field of Classification Search
CPC .......... B29C 59/04; B29C 43/24; B29C 43/46; B29C 43/52; B29C 33/044; B29C 33/424
See application file for complete search history.

(56) References Cited

U.S. PATENT DOCUMENTS 3,752,227 A * 8/1973 Bulson .................. B29C 33/044
165/89
4,519,757 A * 5/1985 Wittkopf ............... B29C 33/044
425/143
(Continued)

FOREIGN PATENT DOCUMENTS

CN 2564334 Y 8/2003
CN 101613502 A 12/2009
(Continued)

OTHER PUBLICATIONS

International Search Report, PCT/EP2014/002429, dated Jan. 8, 2015, 2 pgs.

*Primary Examiner* — James P MacKey
(74) *Attorney, Agent, or Firm* — Paul D. Strain, Esq.; Strain & Strain PLLC

(57) ABSTRACT

The present invention discloses a plastic processing roll, comprising a rigid inner cylinder covered at least partially by at least one flexible liner. Said flexible liner comprises a plurality of fluid ducts, each of which being connected to an inflow duct and being connected to an outflow duct. An elastic metal sleeve encases said flexible liner and is designed to be friction-locked by means of pressurizing the fluid ducts. Said flexible liner is formed by a plurality of longitudinal elements being arranged in parallel to each other, wherein each of said longitudinal elements houses at least one of said fluid ducts. Furthermore a plastic processing device and a method for producing double-sided structured plastic films is disclosed.

38 Claims, 10 Drawing Sheets

Figure 1:
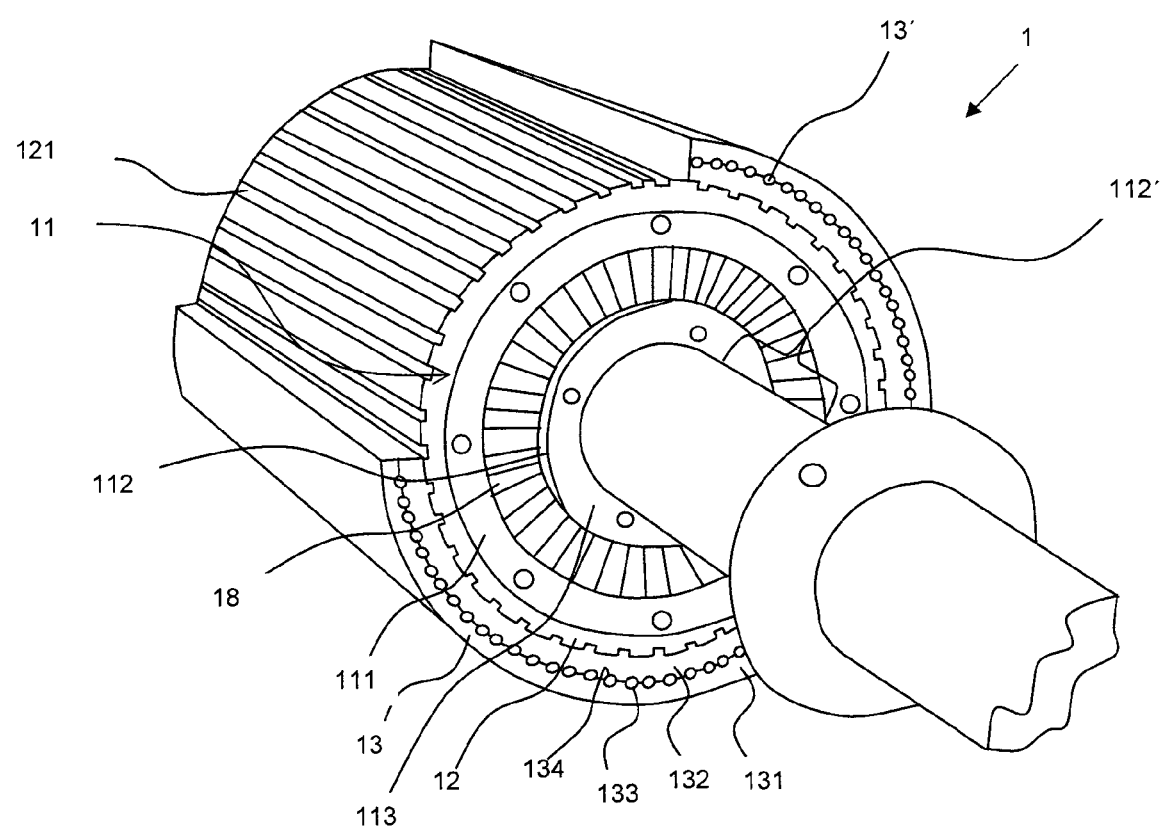

(51) Int. Cl.
    *B29C 33/04*           (2006.01)
    *B29C 33/42*           (2006.01)
    *B29C 43/52*           (2006.01)
    *B29K 23/00*           (2006.01)
    *B29L 7/00*             (2006.01)

(52) U.S. Cl.
    CPC .............. *B29C 43/46* (2013.01); *B29C 43/52* (2013.01); *B29K 2023/12* (2013.01); *B29L 2007/008* (2013.01)

(56) References Cited

U.S. PATENT DOCUMENTS 6,059,003 A * 5/2000 Wittkopf ............... B29C 33/044
                                                    100/176
2007/0060457 A1* 3/2007 Bomba ................ B29C 33/044
                                                      492/46

FOREIGN PATENT DOCUMENTS

| | | |
|---|---|---|
| DE | 40 36 121 A1 | 1/1992 |
| EP | 1 143 217 A2 | 10/2001 |
| WO | WO 2006/089882 A1 | 8/2006 |
| WO | WO 2006/089883 A1 | 8/2006 |
| WO | WO 2006/089885 A1 | 8/2006 |

* cited by examiner

PLASTICS PROCESSING ROLL, PLASTIC FILM PROCESSING DEVICE AND METHOD FOR PRODUCING DOUBLE-SIDED STRUCTURED PLASTIC FILMS

CROSS-REFERENCE TO RELATED PATENT APPLICATIONS

This application is a National Stage of International Application No. PCT/EP2014/002429, filed Sep. 8, 2014, which is based upon and claims the benefit of priority from prior European Patent Application No. 13004400.1, filed Sep. 10, 2013, the entire contents of all of which are incorporated herein by reference in their entirety.

The invention relates to a plastic processing roll, a plastic film processing device and a method for producing double-sided structured plastic films.

To process molten plastics to produce plastic films, it is known to use at least two rotating rolls, wherein the molten plastic is squeezed between the two rolls. Typical calendaring or extrusion-quenching units often comprise more than two rolls, wherein at least one metal roll comprises a surface finish that is to be transferred onto the plastic film, e.g. a high-gloss finish or predefined structuring. To compensate roll bending due to the pressure in a contact zone between said rolls, to maintain a uniform pressure in said contact zone and in order to obtain a large contact surface in said contact zone, it is known to use a deformable counter roll made of or comprising a layer out of a suitable flexible material, such as rubber. Disadvantageously, rubber compared to metal has a lower thermal capacity and conductivity. This causes the rubber roll to engage a service temperature which is too high for producing a high-quality film and has negative effect on the embossing. Therefore, it has been proposed to arrange ducts in the rubber layer being circulated by a conditioning fluid. A rubber roll with fluid ducts can still only be used for a very restricted time period, because the thermal conductivity of the rubber is too low to transmit heat effectively to said conditioning fluid. Further it has been proposed to arrange a metal sleeve around said rubber layer in order to produce double-sided high-quality surface films having mat, high-gloss or structured surfaces.

Two rolls of aforementioned type are disclosed in WO 2006/089883 A1 and WO 2006/089882 A1 and comprise a rigid inner cylinder covered by a flexible layer therein. Said flexible layer comprises a plurality of fluid ducts that are arranged substantially parallel to the roll axis and are connected to fluid connectors in order to ensure entry and exit of fluid, wherein in the ducts are formed by hoses or pipes embedded in the flexible layer. By regulating fluid pressure said flexible layer can be expanded radially in order to clamp a metal sleeve that is attached over the flexible layer. The flexible layer can consist of several annular rings that in roll axis direction are stacked over each other. In order to prevent the fluid duct pattern to "draw" itself on the sleeve, a protective layer is proposed between the flexible layer and the sleeve, which negatively effects the heat dissipation from the sleeve into the fluid additionally. The connection of said fluid ducts to a hydrothermal conditioning device is realised through a concentric drill hole in the rigid cylinder, which is fluidically connected to the axial ends of the fluid ducts.

Rolls according to the aforementioned state of the art have low thermal conductivity of the flexible liner as well as of the protective layer, causing the surface temperature of the sleeve to raise over a tolerable level. Furthermore, the pattern of the pressurised fluid ducts becomes visible as an imprint on the produced film as characteristic lining or chattering. Due to the parallel alignment of the fluid ducts to the roll axis, the fluid is being pressed out of the relevant fluid duct in the contact zone and has to recirculate back in the fluid duct when the relevant fluid duct has ceased to be compressed.

Based on the aforementioned state of the art, it is an objective of the present invention to provide a plastic processing roll that overcomes the described disadvantages of known rolls of the same type and enables the production of plastic films with an optimised quality surface finish, further it is an objective to provide rolls being suitable for continuous use.

This object of the invention is solved by a plastic processing roll according to independent claim 1.

It is another object of the present invention to provide a plastic processing device for producing higher quality films compared to state of the art devices for processing plastics and allowing the production of double-sided structured plastic films featuring a holographic effect.

This object of the invention is solved by a plastic processing device according to claim 15.

Finally, it is another object of the present invention to provide a method for producing double-sided structured plastic films, in particular films with holographic effects, with fewer process steps and using less production machinery than known production methods do.

This object of the invention is solved by a method for producing double-sided structured plastic films according to claim 17.

Preferred embodiments of the apparatuses and the method are set forth in the dependent claims.

A plastic processing roll according to an embodiment of the invention in a first embodiment comprises a rigid inner cylinder covered at least partially by at least one flexible liner. Said flexible liner comprises a plurality of fluid ducts, wherein each of the ducts is connected to an inflow duct and to an outflow duct. The flexible liner is encased by an elastic metal sleeve that is designed to be friction-locked by means of pressurizing the fluid ducts. Said flexible liner is formed by a plurality of longitudinal elements that are arranged parallel to each other, wherein each of said longitudinal elements houses at least one of said fluid ducts.

"Liner" herein means a flexible layer covering the rigid inner cylinder that is arranged over the rigid inner cylinder like a bushing. "Elastic" means that the sleeve is designed to follow a deformation of the flexible liner without undergoing any plastic deformation, as otherwise cracks, offsets or similar surface defects might become visible on the sleeve surface affecting the quality of the produced film directly.

The fluid ducts are intended to be connected to a fluid conditioning device providing the conditioning fluid having a specified temperature and pressure. "Resetting" of the sleeve after deformation is achieved by both its internal tension and the pressurized fluid channels of the roll. In order to friction-lock the sleeve on the flexible liner the fluid ducts are pressurized with a predefined pressure, causing the ducts and indirectly the flexible liner to expand radially. An angular position of said sleeve can be maintained under the influence of typical loads occurring by friction-locking during production of plastic films. Friction-locking is well known and used for film production using state of the art rolls of the same type. In contrast to said rolls, the flexible liner of the roll according to an embodiment of the invention consists of a plurality of longitudinal elements comprising the fluid ducts directly, without the need of embedding a tube or the like. Advantageously, said ducts are continuously extending in longitudinal direction, thus not interrupted. Each duct is contained in a single longitudinal element, making it easier to keep the fluid ducts leak-proof.

As said fluid ducts are formed directly in the material of the flexible liner without any hose or pipe between the flexible material and the fluid, heat transfer capability is improved significantly. Thermal resistance along the entire thermal path from the surface of the sleeve to the fluid is reduced remarkably.

The roll according to an embodiment of the invention can be produced cheaper than known rolls, by avoiding labour-intensive embedding of the individual fluid hoses or pipes in the flexible layer. The longitudinal segments can cheaply be produced by extrusion means out of rubber or any other suitable flexible material. The entire flexible liner consists of identical profiles arranged in parallel around the circumference. Thus, the roll according to the invention can be used in a calendaring or extrusion-quenching plant over a long time without overheating. Production of high quality films in mass-production is thereby allowed—said device according to an embodiment of the invention accordingly exceeds known rolls only being suitable for lab-scale production of films. Improved cooling properties of the roll according to an embodiment of the invention allow film production with double sided high-gloss surface as the surface temperature of both rolls can be kept low, especially when processing polypropylene (PP).

Advantageously, already existing plastic processing devices, in particular embossing units, can be retrofit with rolls according to an embodiment of the invention simply by replacing state of the art rolls.

In another embodiment of the roll, said flexible liner can be tube shaped, in particular be a ring or polygonyl shaped tube. The longitudinal elements are arranged in parallel adjacently aligned to each other, wherein the longitudinal elements are extending axially from a first to a second end of said flexible liner either parallel to the axis of the inner cylinder or spirally wound from a first to a second end of the flexible liner.

By winding the fluid ducts spirally around the inner cylinder the problem which comes up when a roll with parallel channels is used regarding complete emptying of the ducts when in contact with each other, can be avoided. Advantageously, when the flexible liner comprising the fluid ducts is deformed in line-contact with the corresponding counter roll, each fluid duct is deformed only at the contact portion, thus only this volume of each duct is emptied of fluid. In state of the art rolls ducts are emptied completely when contact takes place which disadvantageously leads to insufficient cooling of the entire roll as the ducts cannot be refilled fast enough, especially at high rotations.

As the cross section of the fluid ducts in a plane normal to the roll axis of spirally wound fluid ducts is larger than in the parallel arrangement of state of the art rolls, and radial stiffness of the roll oscillates less in circumferential direction advantageously the characteristic fluid duct pattern otherwise being imprinted in the film during production is less visible.

In yet another embodiment, each of the longitudinal elements can exhibit a ring segment cross section or a trapezoidal shaped polygon ring segment cross section.

As described above, the cross-section of the entire flexible liner can preferably be a ring circle, but also a circle converged by a polygon. Typically more than ten segments, preferably a higher number, is needed to achieve an acceptably round flexible liner.

In addition, each of the longitudinal elements can be adhesive-bound, preferably glued, to its neighbouring longitudinal elements at lateral contact surfaces.

For continuous use of said rolls it is suggested to couple the profiles at their lateral contact surfaces via adhesive-bonds, thereby improving fluid-tightness of the ducts.

Moreover, said longitudinal elements can at least be partially comprised of a heat conductive flexible material, such as a conductive polymer, in particular heat conductive silicone. The heat conductive flexible material can comprise metal particles, metal fibres or metal powder, wherein said metal preferably can be selected from the group comprising copper, silver, aluminium, nickel. Additionally or alternatively, the heat conductive flexible material can comprise ceramic particles, ceramic fibres or ceramic powder, wherein the ceramic material is preferably boron nitride. Besides, it is also possible that the flexible material comprises carbon particles, fibres and/or powder.

Heat conductive polymers, especially heat conductive silicones, comprising particles, fibres and/or powder consisting of heat conductive material, are readily available and being used in electromagnetical shielding and thermal management of electronic devices. Compared with thermal conductivity of about 0.2 W/mK of standard silicone, thermal conductivity of heat conductive silicone can be more than 10 times higher. By only changing the material the heat dissipation capability of the roll can be improved to a significant extent.

According to yet another embodiment each of the longitudinal elements can be comprised of two parts, especially of two halves, wherein each of the two parts can comprise an axial extending contact surface. The two parts can be attached to each other along the relevant contact surfaces, wherein the fluid duct can be formed by two grooves located in the respective contact surfaces of the two parts complementing one another. Advantageously, one of the grooves can have a larger volume than the complementary groove and can be located in the part opposite to the rigid inner cylinder. Alternatively or additionally, this part can consist of the described heat conductive flexible material.

An embodiment comprising elements axially split shows the larger part of the fluid duct in the upper or "outer" halve—with respect to the axial center of the roll—and which consists of said heat conductive flexible material, hence providing the major share of the heat transfer. The lower or "inner" halve thus can be made of another, rather cheap standard material not requiring particular heat conducting properties. With the combination of said different materials it is achieved, that despite an optimized heat transfer from the metal sleeve into the fluid, the rigid inner cylinder is shielded thermally. Anyhow, it is possible that the longitudinal elements' outer halves consist of said thermally conductive flexible material and the inner halves consist of a standard silicone while the longitudinal elements can be produced in one step by means of bi-material extrusion.

According to yet another embodiment an intermediate layer can be arranged between the rigid cylinder and the flexible liner. Said intermediate layer can be made of a material having an elastic modulus larger than the elastic modulus of a material of the flexible liner but smaller than the elastic modulus of the material of the rigid cylinder.

If the rigid inner cylinder does not incorporate heat dissipation means it is advantageous that the intermediate layer has a low thermal conductivity. A high thermal conductivity of the intermediate layer will be favourable if the rigid inner cylinder comprises an own heat dissipation system, as the overall thermal efficiency of the roll can be improved thereby.

Furthermore, the use of the intermediate layer is advantageous, because depending on the material selected for the intermediate layer, said intermediate layer might correspond better to combine the longitudinal segments adhesively to the intermediate layer than to bond it directly to the rigid inner cylinder. Joining the rigid inner cylinder with the intermediate layer may be achieved using any suitable joining-technique, for instance comprising the steps: applying a primer to the rigid inner cylinder, covering the rigid inner cylinder with the material of the intermediate layer, preferably with rubber, and vulcanizing.

Moreover, each of the longitudinal elements may comprise at least one longitudinal rib facing the rigid inner cylinder or the intermediate layer. In this case the rigid inner cylinder or the intermediate layer provide corresponding grooves, each of said grooves being designed to receive one of said ribs.

These ribs allow the segments to be held by form-fit joining elements in addition to the adhesive-bonding, which improves the relative angular positioning of the segments and counteracts relative movement of the segments under load. In case the grooves exist in the intermediate layer, it is possible to cheapen rigid inner cylinder production, as less machining is necessary.

In yet another embodiment each of the fluid ducts can have an inflow end portion and an outflow end portion, each having an opening being fluidically connected with a conduit. The conduit can particularly extend radially towards a centre of the roll and is connected fluidically with a bore provided in the rigid inner cylinder, wherein the bore is advantageously arranged radial in said inner rigid cylinder. Said radial bore is fluidically connected to either the inflow duct or the outflow duct/end portion, wherein said inflow and/or outflow duct are/is formed by a coaxial drill hole in the inner rigid cylinder.

Herein, "end portion" shall be understood as an end part of the duct, having a predefined length. Since it is otherwise necessary to seal the duct at its very end, it is preferred that in an embodiment of the invention a junction is provided by the duct and a conduit received by same, so once the conduit-duct junction or T-junction, respectively, is sealed inside the roll it's kept in place and remains fluid-tight. Further, the conduit may (when the duct is split in halves) comprise a collar or flange. Then, internal pressure in the duct even can improve sealing.

Each fluid duct can additionally comprise a liquid-tight sealing at its endings, wherein the liquid-tight sealing can advantageously be a plug. The plug can be received, in particular can be adhesive-bound, advantageously glued, in place within the open end of said fluid duct. In this sense "end" literally means the real end of the duct. Of course it is also possible to use other sealing means than those described above, for example a clamping ring which is circumferentially extended and tightened to crimp the ducts.

The rigid inner cylinder can comprise a heat dissipation system as well, preferably comprising at least one fluid channel, more preferably a number fluid channels located underneath an outer shell surface of said rigid inner cylinder. Even more preferably the fluid channels can be extending parallel to the roll axis.

The additional heat dissipation system incorporated in the rigid inner cylinder provides an increased heat dissipation compared with a device having fluid ducts in the flexible liner only. When a flexible material with high thermal conductivity is used for the inner halves of the longitudinal segments it is possible to transmit a significant share of the heat from the sleeve to the heat dissipation system in the rigid inner cylinder, thus keeping the surface temperature of the sleeve lower and increasing thermal efficiency. In addition to the separately provided fluid channels the heat dissipation system may comprise one integral fluid channel having an annular ring cross section. The heat dissipation system of the rigid inner cylinder may be connected to the same conditioning fluid system as the fluid channels in the flexible liner. The heat dissipation system of the rigid inner cylinder and the fluid ducts of the flexible liner are in parallel or serially hydraulically arranged. In the hydraulic setup having the parallel arrangement, a major share of the conditioning fluid can be fed through the fluid ducts of the flexible liner.

Furthermore, the thermal conductivity of said thermal conductive flexible material may range from 1.4 W/mK to 10 W/mK, wherein 1.8 W/mK to 6 W/mK is advantageous. Alternatively or additionally, said part of the longitudinal element located opposite from the rigid inner cylinder (the "external layer" of the longitudinal segments) can have a thickness ranging from 2 mm to 8 mm. For example a range from 3 mm to 7 mm can be suitable, even a range from 4 mm to 6 mm is acceptable.

Compared to standard polymers such as silicones having a thermal conductivity of approximately 0.3 W/mK, the thermal conductivity can be increased by up to 30 times. Heat transfer from the metal sleeve to the fluid can be improved by decreasing the thickness of the outer part of the longitudinal elements since thickness is linear to heat transfer. It has been found, that using thermal conductive silicone a thickness of the outer part can be as little as 4 mm without affecting its mechanical strength. A thickness of 7 mm is preferred to reduce marking. Of course the given values for thermal conductivity and thickness of the outer part are applicable for longitudinal elements consisting of one single piece as well, wherein the "outer part" can be re-interpreted as the external layer between the fluid duct and the outside surface of the element.

Beyond, the metal sleeve can have a thickness ranging from 0.1 mm to 1 mm, wherein a range from 0.3 mm to 0.7 mm is advantageous. Alternatively or additionally, the metal sleeve can have an outer diameter of 200 mm to 650 mm, wherein 250 mm to 550 mm are advantageous and 300 mm to 450 mm more advantageous.

Said metal sleeve can consist of nickel or nickel based alloys. The use of nickel or nickel based alloys for the sleeve is particularly advantageous, because nickel based alloys feature a high elastic strain, high corrosion resistance and maintain their strength even in high temperature applications. Sleeves made from the aforementioned materials are already used in other printing applications and available as weldless sleeves, e. g. produced by electro deposition. Alloys of that type are readily available and usable for different applications. A larger diameter sleeve is advantageous as better cooling can be achieved due to decreased angle speed of the roll at the same production rate. The pressurized ducts apply pressure on the interior shell surface of the sleeve causing a tensile load in circumferential direction of the sleeve that increases with an increasing diameter of the sleeve as well. The mechanical properties of the sleeve's material therefore limit the diameter of the sleeve at a given working pressure.

Alternatively or additionally, the outer shell surface of the metal sleeve can be anti-stick coated, advantageously with a diamond-like-carbon-coating, a composite diamond coating, a coating comprising nickel and/or polytetrafluorethylene, a chrome plating or any combination thereof.

Furthermore, it is possible that the outer shell surface of the metal sleeve has at least one portion showing a defined surface roughness and/or a defined surface structure, wherein said portion is grinded, polished and/or lapped or has a laser engraved surface.

The defined surface roughness or structuring is designed to give a special surface effect on the produced film. Surface roughness can be lowered, even a polished surface may be provided to obtain a high-gloss film surface. But the surface can be engraved, thus providing a tactile film surface. In a processing device equipped with a counter roll which also has defined surface properties, double-sided high quality surface finished films can be produced.

In another embodiment of the invention, the rigid inner cylinder of the roll can comprise a hollow cylindrical body and a at least one massive insert with a housing part being non-rotatably housed in the hollow cylindrical body and a shaft portion extending outwards along the roll axis having a smaller diameter than the diameter of the housing portion. The inflow duct and the outflow duct can be provided in the shaft portion. The shaft portion can preferably comprise said radial bores extending from the shell surface of the shaft portion to the inflow duct respectively outflow duct.

The roll can be built rather lightweight when the rigid inner cylinder is along a part of its length hollow, only its ends being massive.

Additionally, the shaft portion can comprise an axial flange located in a plane spanned by the axial end of the hollow cylindrical body. In particular the axial flange can be attached fluid-tight to the hollow cylindrical body using an annular cover that is preferably screwed to said flange and said hollow cylindrical body. Due to the relative location of the flange and the end of the hollow cylindrical body, a relatively simple cover design can be used, e. g. a flat cover.

The plastic processing device according to an embodiment of the invention comprises in a first embodiment at least one rigid metal roll and at least one deformable roll as described above; having a number of fluid ducts being fluidically connected to a hydrothermal conditioning unit, wherein the rolls are arranged parallel.

Plastic processing devices of the same type are known as calendaring devices. The rolls are being pressed against each other with a predefined force causing the deformable roll to deform, thus giving a two-dimensional contact zone instead of a virtually line-shaped contact zone, when using two rigid rolls. The force applied on the rolls normal to the contact plane can range from 1 to 10 kN/m per width of the roll. The length available to transfer certain surface properties of the rolls to the produced film is thereby increased and results in a significantly steadier imprint. The deformation of the deformable roll under influence of the described contact force typically will result in a contact zone of approximately 10 to 30 mm width.

With the plastic processing device proposed by the invention, it is possible to produce plastic films with a high-quality surface finish in one processing step, wherein both the rigid metal roll and the deformable roll transfer their surface structure to the product. For example, the produced films can comprise a high-gloss, matt or structured surface, single- or double-sided surface or combinations thereof. Advantageously, the cooling rate of the processed molten plastic can be exceedingly increased by using the deformable roll according to the invention, making it possible to produce crystal clear plastic films.

The hydrothermal conditioning unit is designed to pump a conditioning fluid through the fluid ducts of the deformable roll, wherein the parameters temperature and pressure are adjustable. The conditioning fluid can advantageously be water, due to its high thermal capacity, but can also be any other liquid such as a heat transfer oil. The conditioning fluid can contain anti-freeze agents which themselves can comprise corrosion-inhibitors in order to enable inflow temperatures below 0° C., thus allowing the surface temperature of the sleeve to be kept as low as 25° C. or even lower while in operation. If PP films are to be produced, the mechanical properties of the product are correlated directly to the temperature of the sleeve. A lower temperature (which means a higher cooling rate) results in a higher tensile strain and helps achieve a fine grained structure. The use of the roll according to an embodiment of the invention makes production of films with different surface structurings on the same processing device cheaper, as only a certain number of different sleeves has to be bought and stored and not entire rolls.

In another embodiment the rigid metal roll and the deformable roll can be coupled kinematically.

By coupling the rolls kinematically, it is possible to obtain synchronization between the embossing of either sides of the film. Thereby, interferometric or holographic effects can be obtained in a single processing step. In order to obtain said effects both rolls being in contact must have the same diameter and rotate with the same speed Using a plastic processing device according to an embodiment of the invention, it is no longer necessary to produce two films each having an individual embossing pattern and afterwards joining them in synchronization. Now films with holographic effects on a single layer film can be produced. The plastic processing device according to the present invention can easily be obtained by modifying an existing processing device by merely retrofitting the kinematical coupling between the rolls, the roll according to an embodiment of the invention itself and the hydrothermal conditioning unit.

Finally, the method for producing double-sided structured plastic films according to an embodiment of the invention is carried out using a plastic processing device according to an embodiment of the invention, wherein the rigid roll and the deformable roll have corresponding surface structurings.

Said method comprises the following steps:
a) angularly arranging the metal sleeve according to a predefined parameter depending on the actual kinematic coupling of the rigid roll and the deformable roll,
b) pressurizing the fluid using the hydrothermal conditioning unit up to a predefined pressure,
c) radially expanding the fluid ducts and the flexible layer of the roll under influence of the predefined pressure, thus
d) friction-locking the metal sleeve on the flexible liner,
e) providing and feeding of least partially molten plastic between the rolls,
f) squeezing of the plastic material between the two rolls and imprinting the predefined surface structurings of the rolls on both sides of the plastic material,
g) cooling of the object obtained by step f) and obtaining the double sided structured plastic film.

Of course it is possible to produce double-sided high-gloss films using the above method as well, when both rolls have a polished surface. The locking effect works well, wherein typical pressures range from 1.5 to 10 bar. Under influence of the said pressures the sleeve can be locked effectively against sliding, allowing embossing patterns to be imprinted on either sides of a film with a predefined synchronization. The angular arrangement in step a) can advantageously be done using two laser devices, one allocated to the flexible roll according to the invention and one allocated to its counter roll. Both the sleeve and the counter roll have marks that should be aligned in a predefined angle, e. g. each facing upwards. In the start-up phase of the plastic processing device the sleeve and the counter roll are rotated slowly until each mark is located in the laser beam of the corresponding laser device.

Figure 2:
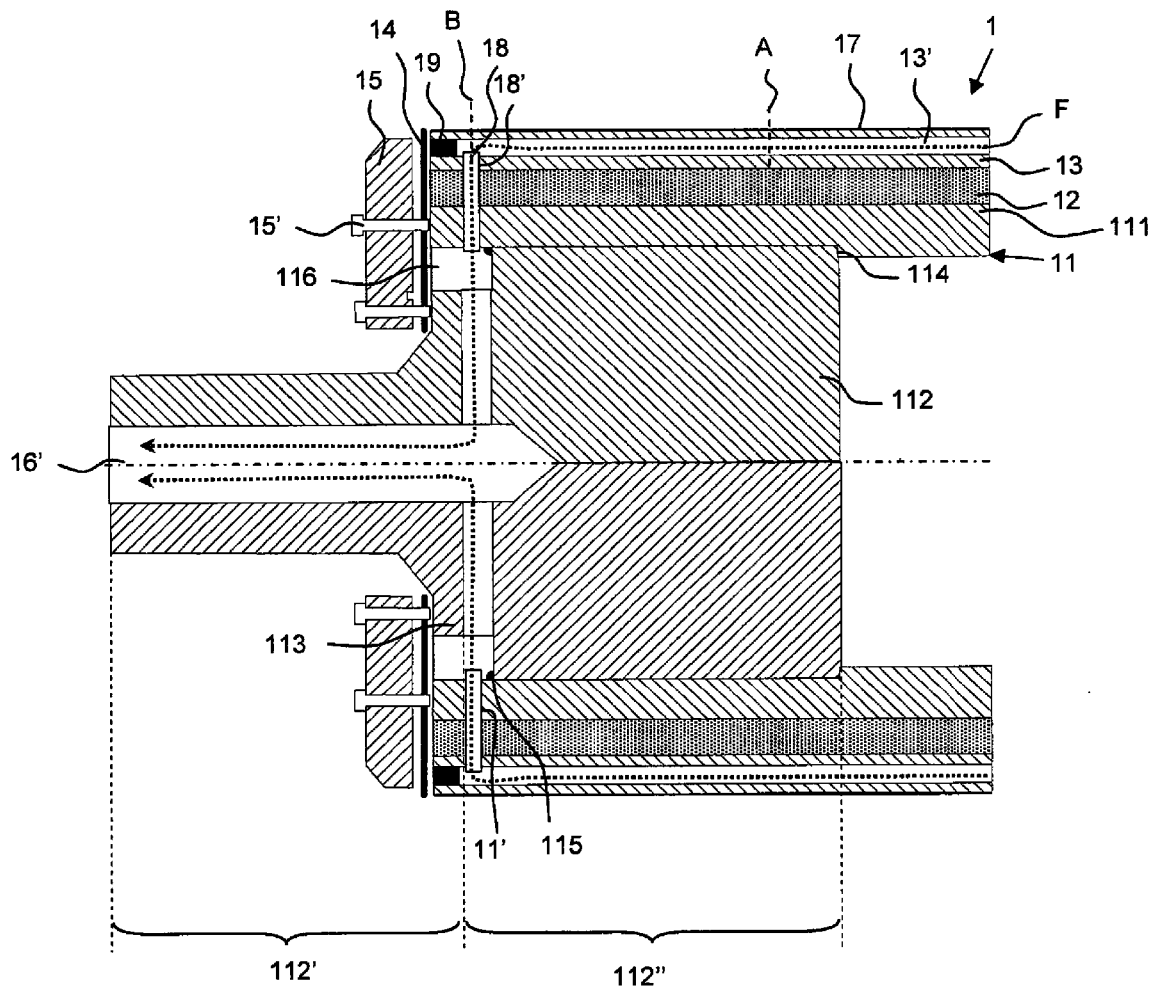
Figure 3:
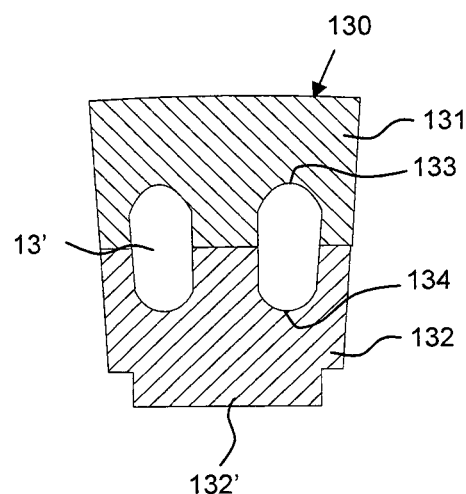
Figure 4:
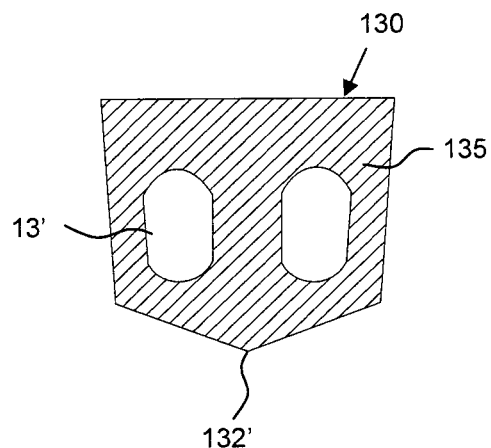
Figure 5:
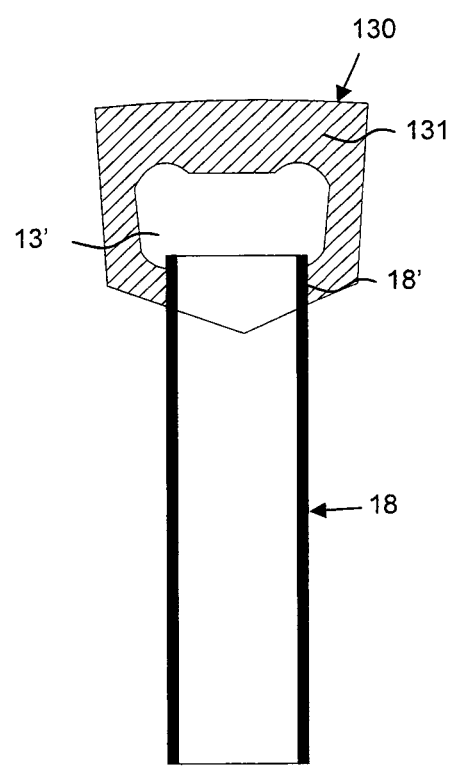
Figure 6:
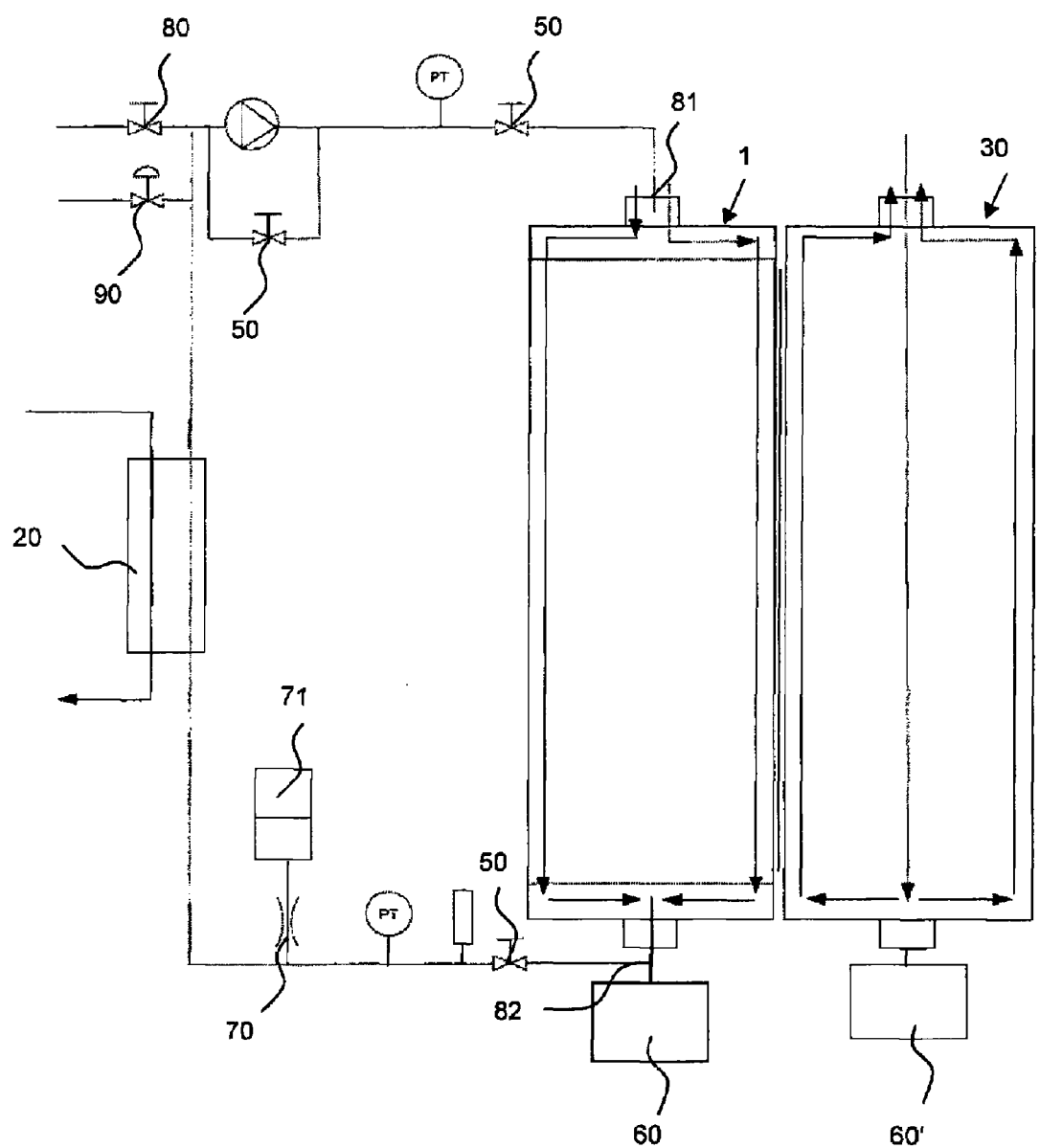
Figure 7:
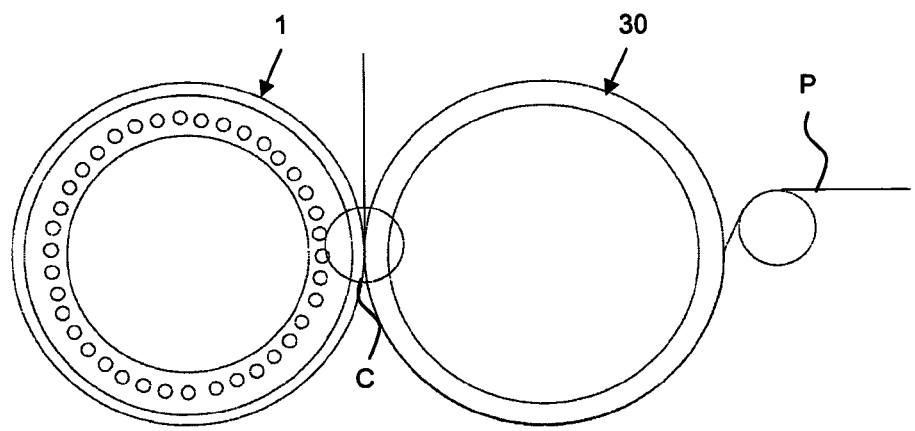
Figure 8:
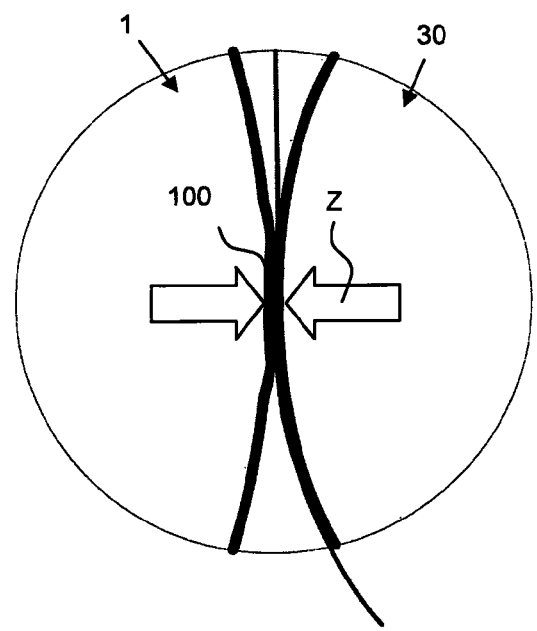
Figure 9:
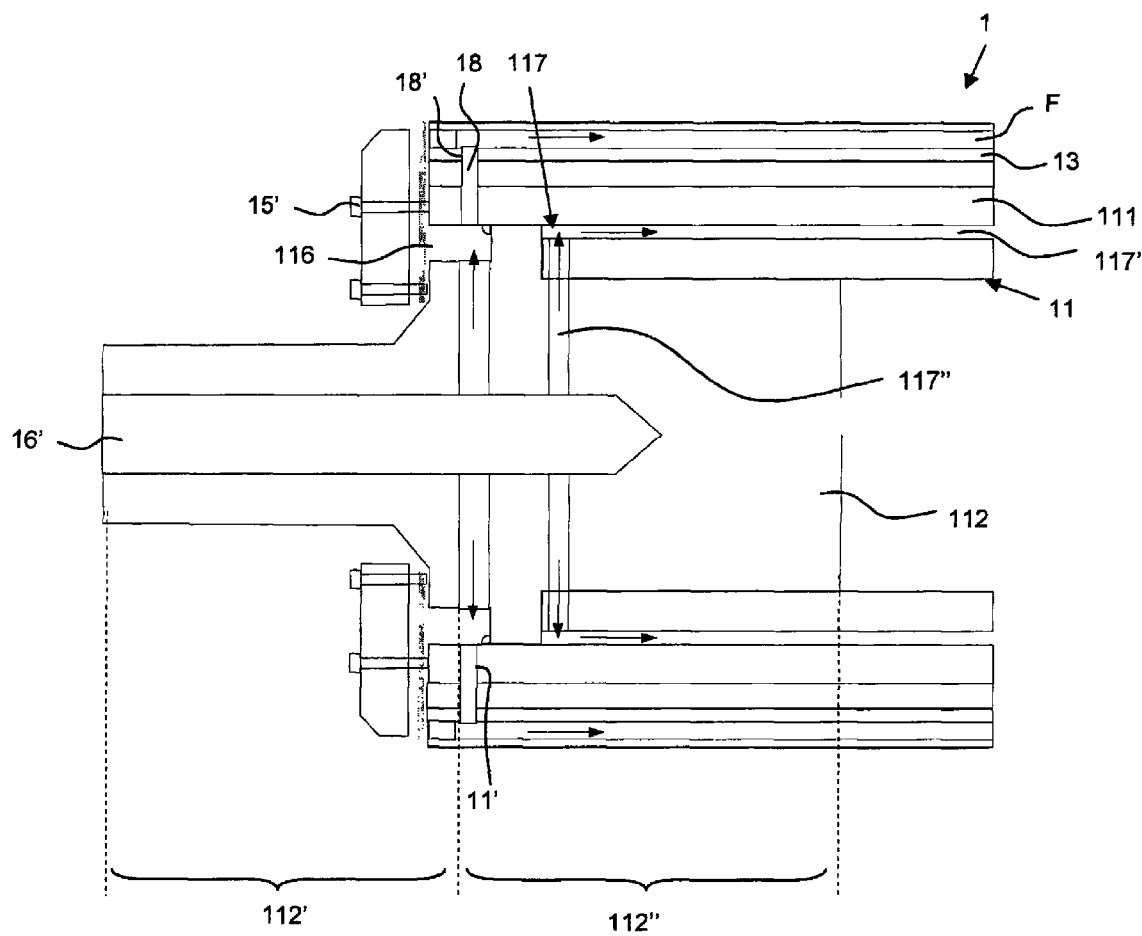
Figure 10:
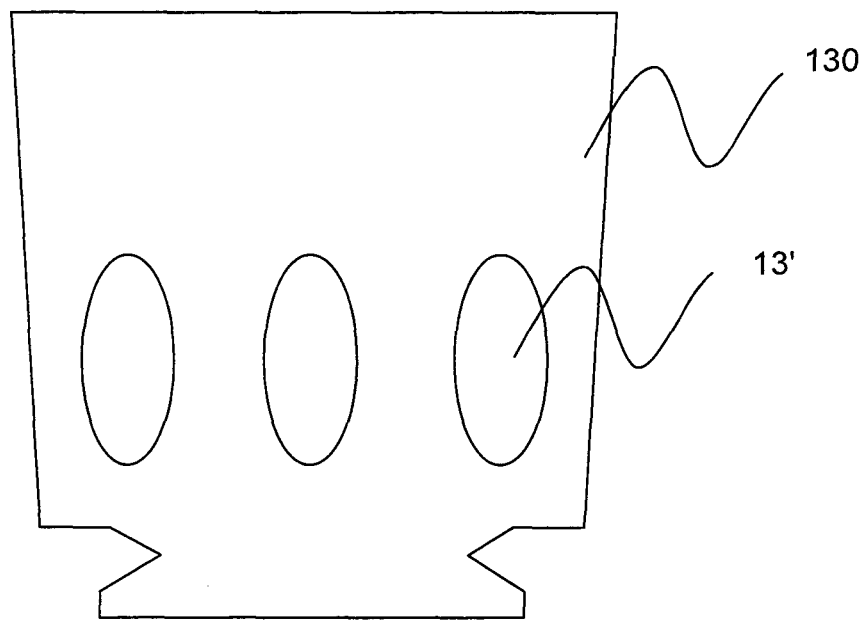

Preferred features, embodiments and variations of embodiments of the invention will become apparent from the following detailed description of the attached figures that show illustrations of preferred embodiments schematically. The detailed description is not to be regarded as limiting the scope of the invention in any way. Objects or parts of objects that are essentially the same or similar can be assigned the same reference numbers. The figures show:

FIG. 1 perspective partial view of a roll without a metal sleeve,

FIG. 2 longitudinal section of one end of the roll,

FIG. 3 cross-section of the split longitudinal element,

FIG. 4 cross-section of plane A-A according to FIG. 2,

FIG. 5 cross-section of plane B-B according to FIG. 2,

FIG. 6 hydraulic system of a plastic processing device,

FIG. 7 partial view of two rolls of said plastic processing device,

FIG. 8 enlarged view of detail C according to FIG. 7,

FIG. 9 longitudinal section of one end of another embodiment of the roll,

FIG. 10 cross-section of an alternative longitudinal element

Figure 11:
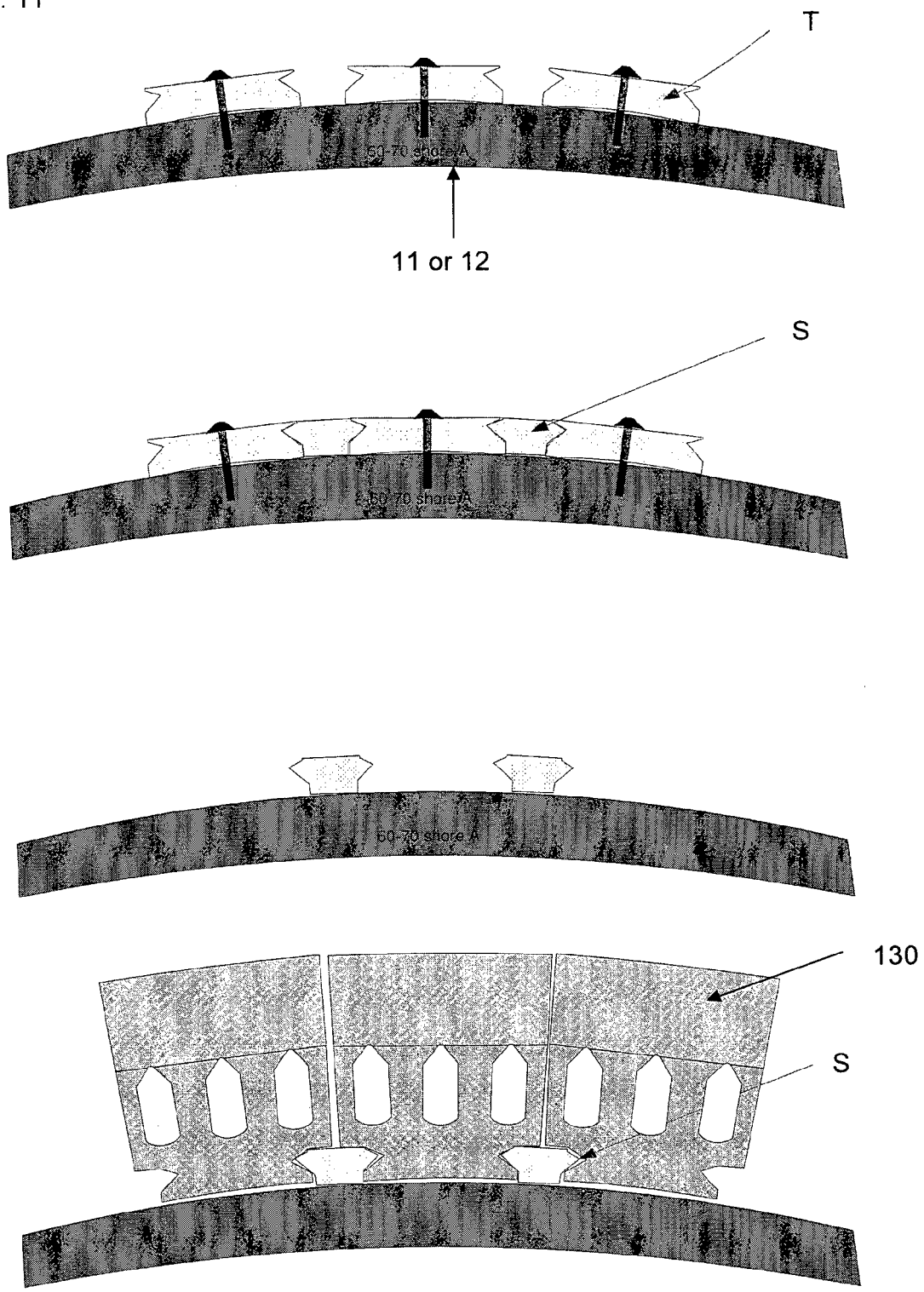

FIG. 11 fixing of the longitudinal elements

Figure 12:
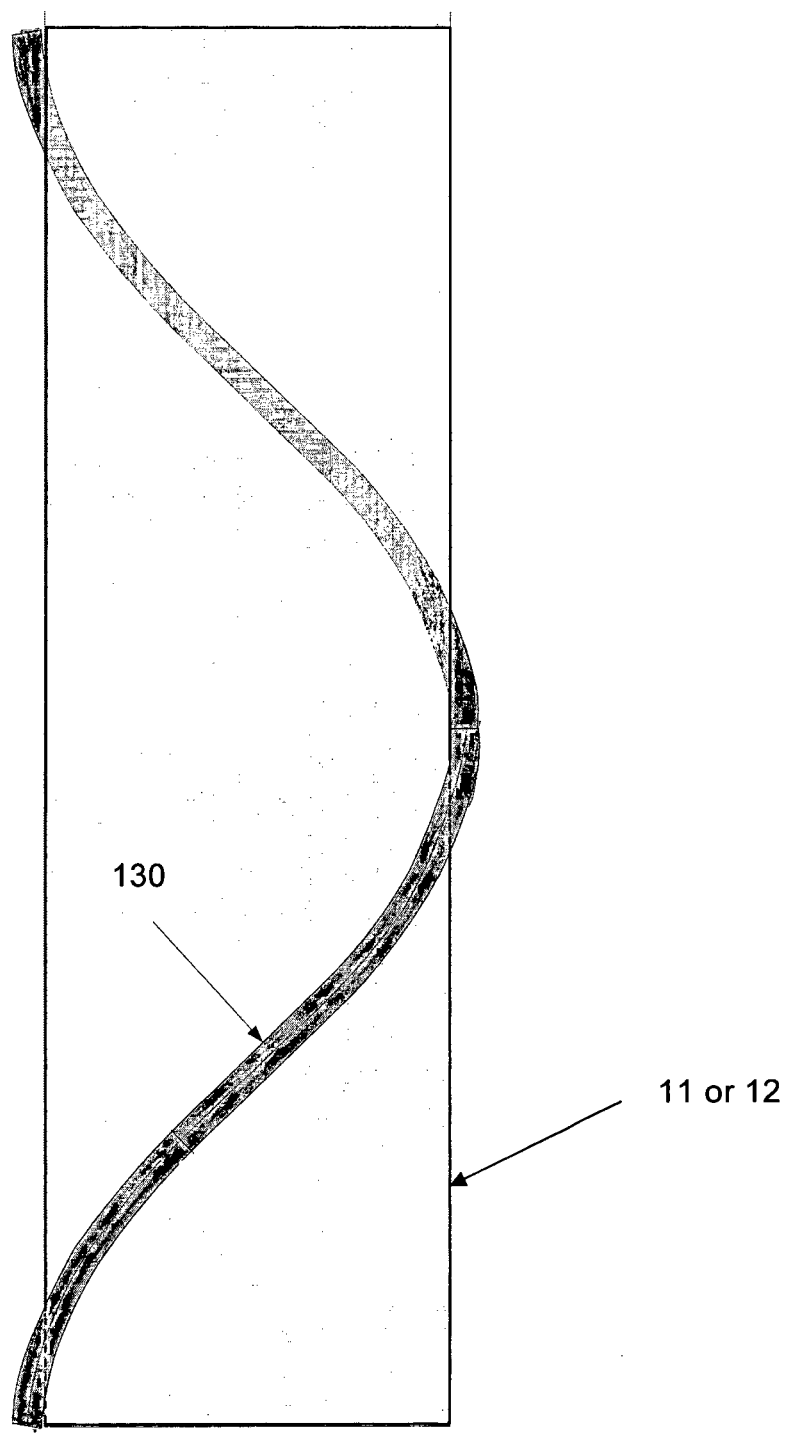

FIG. 12 longitudinal element fixed on a cylinder

FIG. 1 shows the plastic processing roll 1 according to an embodiment of the invention in a perspective partial view, wherein in one angle range the flexible liner 13 is missing to enable a view onto the intermediate layer 12. The roll 1 is shown without the metal sleeve and therefore is to be covered by the metal sleeve featuring well-defined surface properties in order to be used in the production of plastic films, e. g. in calendering or extrusion-quenching devices. The sleeve has a slightly larger inside diameter than the outside diameter of the flexible liner 13, so that it can be easily installed over the flexible liner 13. In order to lock the sleeve against sliding, it is proposed to pressurize the fluid ducts 13 incorporated in the flexible liner 13 are pressurized to a certain extent causing expansion of the fluid ducts 13' and radial expansion of the flexible liner 13, resulting in a friction-lock of the sleeve on the flexible liner 13.

The roll 1 comprises an inner rigid cylinder 11 that is covered by an intermediate layer 12 being covered by a flexible liner 13. The flexible liner 13 comprises a number of parallel arranged fluid ducts 13' formed directly in the flexible liner, pipes or hoses are not needed. This reduces thermal resistance from the shell surface into a fluid circulating through the fluid ducts, as there are no contact surfaces or surface roughness between said fluid and the flexible liner. The fluid ducts can comprise a certain surface roughness on their internal surface in order to keep a flow of conditioning fluid turbulent improving a heat transfer coefficient. The flexible liner 13 containing the fluid ducts 13' consists of a plurality of longitudinal elements 130 arranged equiangular circumferentially around of the roll 1.

The longitudinal segments 130 are split longitudinally and consist of an inner part 131 and an outer part 132. In this embodiment of FIG. 1 the fluid duct is formed by two corresponding grooves 133,134, one in the inner part 132 and one in the outer part 131 of the longitudinal segments 130. The groove 133 in the outer part 131 of the longitudinal segments 130 is deeper, so that a larger share of the cross-section of said fluid duct 13' is located in the outer part 133. The outer part 13 consists of a thermal conductive flexible material, wherein silicone with added metal and/or ceramics fibres, particles and/or powder is used preferably, allowing heat transfer from the metal sleeve to the conditioning fluid circulating through the fluid ducts in a much more efficient way. Simply by increasing the thermal conductivity of the material of the flexible liner 13 heat transfer can be increased up to ten times. The two parts 131,132 of longitudinal segments 130 are glued together at their contact surfaces in order to keep the fluid ducts 13' leak-proof. Besides, the adjacent longitudinal segments 130 are glued to each other along their lateral contact surfaces, resulting in a stiffer structure of said fluid ducts 13' and therefore helping to keep the lateral walls of said fluid ducts 13 leak-proof. The conditioning fluid flowing through the fluid ducts 13' can be any liquid. Preferably water is used due to its high thermal capacity. Each fluid duct 13' has an inflow end and an outflow end, wherein said fluid ducts 13' are connected to a radial conduit 18 at the inflow and outflow ends respectively. The radial conduits are connected with the fluid ducts 13' in a defined distance from their ultimate ends, so that no fluid is circulating in the ultimate ends. To prevent the flow of conditioning fluid between connection points of the radial conduits and the ultimate ends, the fluid ducts 13' can be closed fluid-tight with a plug at their ultimate ends. In this embodiment in marginal portions/regions of each end of said roll 1 no cooling is provided, as the fluid ducts 13' do not access these portions. In plastic processing these marginal portions have no contact to the produced film anyhow. Here the radial conduits 18 consist of hoses that are plugged through radial bores of the rigid inner cylinder 11, wherein they are connected on one longitudinal end of the roll 1 to an inflow duct and at the other end of the roll 1 to an outflow duct, that is formed by a coaxial drilling hole inside the rigid cylinder 11. According to the depicted embodiment the rigid cylinder 11 consists of multiple parts, at each end one hollow cylindrical body 111 being connected to a massive insert 112 non-rotatably joined to the hollow cylindrical body 111. This construction helps to keep the roll 1 relatively lightweight, but still ensures an acceptable stiffness, and a sufficient modulus of resistance against bending around an axis normal to the roll axis in particular. The massive insert 112 has a shaft section 112' extending outwards and is designed to be received/held by a mounting, such as roller bearings. The shaft section 112' comprises the coaxial drill hole for the fluidic connection of the fluid ducts 13' which allows the hydrothermal conditioning device to be connected to the inflow and to the outflow duct at a remote position and to keep the sealing relatively simple.

In FIG. 1 two section planes A, B referring to in FIG. 4 and FIG. 5 are shown.

With the help of FIG. 2 showing a longitudinal section of the rolls 1 internal parts especially the components of the rigid inner cylinder 11 can be explained in detail. In this figure only one end of the roll 1 is shown as both ends of the roll 1 typically have the same design. As described above the rigid inner cylinder 11 is built out of multiple parts, in particular the hollow cylindrical body 111 and the massive insert 112. The massive insert 112 has two portions, a shaft portion 112' extending outwards and a housing portion 112" being comprised in the hollow cylindrical body 111. The housing portion 112 is introduced into the hollow cylindrical body 111 and it rests on a shoulder 114 of the hollow cylindrical body 111 indicating the relative positioning of the massive insert 112. In order to inhibit relative movement of the hollow cylindrical body 111 and the massive insert 112, the massive insert can be press-fit in the hollow cylindrical body 111 or locked using form-fit locking means, e. g. an involute spline or at least one feather key. The relative movement of the massive insert 112 in a direction facing outwards, i.e. in the direction pointing away from the shoulder 114, is limited by a weldseam 115 or can alternatively be achieved by a groove and circlip (not shown in the figure). The path of the conditioning fluid through the fluid ducts 13' and into the outflow duct 16' is exemplary shown with the help of a dotted line F illustrating the flow. The fluid flows in the fluid duct 13' from the right hand side to the left hand side of the picture, as shown by arrows. In an outflow end of the fluid duct 13' the fluid duct is fluidically connected with a radial conduit 18 that extends inwards and is guided in a radial bore 11' of the hollow cylindrical body 111, wherein the radial conduit 18 can consist out of a hose or pipe. After leaving the conduit 18 the conditioning fluid further flows inwards through a radial bore 11' of the massive insert 112, that is fluidically connected to the outflow duct 16'. The roll 1 can be symmetric to a plane normal to the roll axis, as so to say the shown end part of the roll 1 that in fact is the outflow end, can form the inflow end as well, then having an inverse stream direction of flow. In another embodiment that is not shown in this figure the radial conduit 18 can extend through the radial bore 11' of the massive insert 112 as well, thus minimizing pressure drop otherwise caused by vortices in the cavity 116.

As shown in FIG. 2 the area that has to be leak-proof, in this case especially cavity 116, is advantageously covered by cover 15, wherein said area is a relatively small annular gap. Said annular gap can easily be sealed by using a flat gasket 14 and said ring-shaped cover 15 that is screwed to the massive insert 112 as well as to the hollow cylindrical body 111. In order to homogeneously compress the gasket 14 a number of screws 15' is distributed around a circumference of the cover 15 equiangular. It is possible to achieve an absolute water-tight closure of the cavity 116 as the distance from the application point of the resulting pressure force being applied from the fluid to the cover 15 to the screws 15' is relatively short.

FIG. 3 shows a cross-section of a longitudinal element 130 that comprises two parts, an inner part 131 and an outer part 132. Part 132 is located near to the rigid inner cylinder 11 of the roll (see FIG. 1 and FIG. 2) and part 132 is located far from the inner rigid cylinder 11. The inner part 132 comprises two ribs 132' that extend along the elements longitudinal axis. The ribs 132' are designed to be received by corresponding grooves of the intermediate layer or the rigid inner cylinder 11 of the roll 1 (see FIG. 1 and FIG. 2) and to achieve a form-fit lock at an angular position. Each of the longitudinal elements 130 comprises two fluid ducts 13' arranged parallel to the axis of the element 130. Each of the fluid ducts 13' is formed by two corresponding grooves in the two parts 132,131. The two parts 132,131 are glued together along their contact surface in order to obtain fluid- and pressure-tight fluid ducts 13'. The parts 131,132 of the longitudinal elements 130 can be produced in a cheap way using (co)extrusion, wherein different materials can be used for the inner 132 and the outer part 131. The outer parts 131 can be preferably consist of heat conductive silicone comprising metal and/or ceramic fibres, particles or power, while the inner part 132 can be made from standard material or be optimized with respect to its gluing and/or friction properties. Although not shown in the figure, it is possible and advantageous if the longitudinal segment consists only of one single part, as it is much easier to keep the fluid ducts 13' leak-proof over a long period of time if no such error-prone stage of production like gluing is to be performed. Extra costs caused by the fact that the entire profile is made from said thermal conductive material can be compensated by savings from avoiding the gluing step.

FIG. 4 shows the cross-section of the longitudinal element 130 according to the section plane A-A shown in FIG. 1 that is located in a straight portion of the fluid duct 13'. The longitudinal element 130 consists of one single piece 135 incorporating two parallel fluid ducts. The rib 132' is attached centrally to the body structure and extends in parallel. Advantageously such a longitudinal element 130 is cheap in production as it requires no gluing step and can be made leak-proof more easily.

FIGS. 3 and 4 show two ducts 13' per longitudinal element 130, one duct 13' or preferably three ducts 13' can be used. The depth of the ducts 13' is chosen such that it provides an optimal compromise between cooling performance and surface deformation. Depths from 4 mm to 9 mm are suitable, wherein 4-6 mm provide the best cooling and 6 to 9 mm are optimal with respect to surface deformation. It has been proven advantageous to design the ducts with a ratio of depth/width from 0.5 to 1.5, preferred are 1.1 to 1.2. The distance between ducts should also be chosen to optimize surface deformation and cooling, distances of 3 to 10 mm are useful, preferred are 5 to 7 mm.

The cross section in FIG. 5 refers to plane B-B shown in FIG. 1 located at an axial position of the conduit 18. The two parallel fluid ducts 13' shown in FIG. 4 are united into one large fluid duct 13'. The longitudinal element 130 further has an opening 18' on its inner side corresponding with respect to its form and dimension with the conduit 18 being introduced partly into the longitudinal element 130. The conduit 18 can be glued into the opening or attached fluid-tight to it using any other suitable joining technique.

FIG. 6 depicts a hydraulic system/circuit of a plastic processing unit and the roll 1 according to an embodiment of the invention being in contact with a metal, e.g. steel, counter roll 30. The roll 1, in particular the fluid ducts incorporated in its flexible liner, is hydraulically connected to an inflow connector 81 and an outflow connector 82, wherein a pump 40 circulates the conditioning fluid. Both rolls 1, 30 are rotated by a motor, wherein motor 60 rotates the deformable roll 1 and motor 60' rotates the metal roll 30. The hydraulic system further comprises several valves 50 to adapt the system characteristics given by pressure drops in the piping, chokes, the roll and the pump, respectively. Further, a temperature conditioning device 20 is incorporated in the hydraulic circuit, while system pressure used for locking the sleeve is set/controlled by the filling valve 80. The pressure in the hydraulic system can be released in order to remove the metal sleeve using the pressure relief valve 90. Downstream the outflow connector 82 an expansion vessel 71 is provided that compensates temperature fluctuations and accepts fluid volumina being pressed out of the respective fluid ducts while in line contact with the metal roll. In order to avoid the hydraulic system to uncontrollably resonate a flow restrictor 70 is provided in the inflow pipe of the expansion vessel 71.

The partial views of the two rolls 1, 30 being in contact to each other are shown in FIG. 7, while FIG. 8 shows detail C from FIG. 7. The contact force between the rolls 1, 30 is referenced by reference symbol Z. Under influence of the contact force Z the deformable roll 1 forms a flattened zone 100 in the contact zone having a typical height of 10 to 30 mm for rolls 1, 30 with outer diameters of approximately 350 mm and under exposure of typical contact forces between 1 and 10 kN per m width of the roll. Along the height of the contact zone the surface properties of the rolls 1, 30 are transferred to the produced film P, wherein the dimensions of the flattened zone 100 can be varied by adjusting the pressure in the hydraulic system.

FIG. 9 shows a longitudinal section of another embodiment of the roll 1 that comprises a rigid inner cylinder 11 with an own heat dissipation system 117 that comprises a plurality of fluid channels 117' arranged under the shell surface of the rigid inner cylinder 11. Thereby heat can be removed from the roll 1 both by the fluid ducts F incorporated in the flexible liner 13 and by the fluid channels 117' incorporated in the rigid inner cylinder 11. The fluid channels 117' can be directly formed in the material of the rigid inner cylinder 11 or comprise hoses or pipes that are embedded therein. The connection to the inflow and/or outflow duct 16' is realized similar to the connection of the fluid ducts F of the flexible liner 13 by conduits 117'' extending radially inwards to the inflow respectively outflow duct 16'. The share of conditioning fluid flowing through the heat dissipation system 17 of the rigid inner cylinder 11 can be adjusted by one or multiple chokes, preferably adjustable chokes. For example 70% to 90% of the total flow can flow through the fluid ducts F of the flexible liner 13.

FIG. 10 shows a cross-section of an alternative longitudinal element 130. This element 130 is equipped with three ducts 13', that have a higher depth to width ratio than those in FIGS. 3 and 4. Like the element 130 in those figures the element 130 of FIG. 10 can be made from one material as shown or from two materials. The element 130 in FIG. 10 is adapted for an advantageous method of fixing to the rigid inner cylinder 11, that is illustrated in the following figures.

FIGS. 11 and 12 show the fixing of the longitudinal elements 130 on the rigid inner cylinder 11 or an intermediate layer 12. As shown in FIG. 11, in the first step teflon parts T are arranged on the cylinder 11 or layer 12 and fixed. Then, silicone S is filled into the gaps formed between the parts. When the silicone S is solid, the parts T are removed and the longitudinal elements 130 are fixed on the cylinder 11 or layer 12 by inserting the silicone forms on the cylinder 11 or layer 12 into correspondingly formed ridges of the elements 130.

FIG. 12 shows one longitudinal element fixed on a cylinder 11. In this case, the element 130 is arranged spirally. The other parallel elements are arranged in the same way.

This application claims priority of EP 13004400.1, the contents of which are incorporated herein by reference in their entirety.

LIST OF REFERENCE NUMERALS

| | |
|---|---|
| 1 | Plastics processing roll |
| 11 | Rigid inner cylinder |
| 111 | Hollow cylindrical body of the rigid inner cylinder |
| 112 | Massive insert of the rigid inner cylinder |
| 112' | Shaft portion of the massive insert |
| 112" | Housing portion of the massive insert |
| 113 | Flange of the shaft portion of the massive insert |
| 114 | Shoulder of the hollow cylindrical body |
| 115 | Welding seam |
| 116 | Cavity |
| 117 | Heat dissipation system of the rigid inner cylinder |
| 117' | Fluid channel of the heat dissipation system |

-continued

| | |
|---|---|
| 117" | Radial conduit of the heat dissipation system |
| 11' | Radial bore of the rigid inner cylinder |
| 12 | Intermediate layer |
| 13 | Flexible liner |
| 13' | Fluid duct |
| 130 | Longitudinal element of the flexible liner |
| 131 | Outer part of the longitudinal element located far from the rigid cylinder |
| 132 | Inner part of the longitudinal element |
| 132' | Longitudinal rib of the inner part of the longitudinal element |
| 133 | Groove of the outer part of the longitudinal element |
| 134 | Groove of the inner part of the longitudinal element |
| 135 | Single piece of an embodiment of the longitudinal element |
| 14 | Silicone gasket of the cover |
| 15 | Cover |
| 15' | Screw of the cover |
| 16 | Connection end of the shaft section of the massive insert |
| 16' | Inflow respectively outflow duct |
| 17 | Metal sleeve |
| 18 | Radial conduit |
| 18' | Opening of the fluid duct |
| 19 | End plug of the fluid ducts |
| 20 | Conditioning device |
| 30 | Steel counter roll |
| 40 | Circulation pump |
| 60 | Drive motor of the deformable roll |
| 60' | Drive motor of the steel roll |
| 70 | Flow restrictor |
| 71 | Expansion vessel |
| 80 | Filling valve |
| 81 | Inflow connector |
| 82 | Outflow connector |
| 90 | Pressure release valve |
| 100 | Flattened zone |
| A | Section plane |
| B | Section plane |
| F | Streamlines |
| P | Produced plastic film |
| S | Silicone (part) |
| T | Teflon part |
| Z | Contact force |

The invention claimed is:

1. A plastics processing roll, comprising
a rigid inner cylinder covered at least partially by at least one flexible liner, said flexible liner comprising a plurality of fluid ducts, wherein each of the plurality of fluid ducts is connected to an inflow duct and to an outflow duct, wherein an elastic metal sleeve encases said flexible liner and is configured to be friction-locked onto the flexible liner by pressurizing the fluid ducts such that the fluid ducts and the flexible liner expand radially, wherein said flexible liner is formed by a plurality of longitudinal elements being arranged in parallel to each other, wherein each of said plurality of longitudinal elements houses at least one duct of said plurality of fluid ducts, wherein the plurality of fluid ducts are formed directly in the material of the flexible liner.

2. The plastics processing roll according to claim 1, wherein the plurality of longitudinal elements are arranged in parallel to each other and extend
straight from a first to a second end of said flexible liner, or
spirally wound from a first to a second end of said flexible liner.

3. The plastics processing roll according to claim 1, wherein each of said plurality of longitudinal elements is adhesive-bonded to its neighbouring longitudinal elements at lateral contact surfaces.

4. The plastics processing roll according to claim 1, wherein the plurality of longitudinal elements are least partially comprised of a heat conductive flexible material, wherein the heat conductive flexible material comprises:
  at least one of metal particles, metal fibres, metal powder, and/or
  at least one of ceramic particles, ceramic fibres, or ceramic powder, and/or
  at least one of carbon particles, carbon fibres, carbon powder.

5. The plastics processing roll according to claim 4, wherein the heat conductive flexible material is a heat conductive polymer.

6. The plastics processing roll according to claim 4, wherein the heat conductive flexible material is a heat conductive silicone.

7. The plastics processing roll according to claim 4, wherein the metal is selected from the group consisting of copper, silver, and aluminium.

8. The plastics processing roll according to claim 4, wherein the ceramics material is boron nitride.

9. The plastics processing roll according to claim 4, wherein the thermal conductivity of said heat conductive flexible material ranges from 1.4 W/mK to 10 W/mK.

10. The plastics processing roll according to claim 3, wherein the plurality of longitudinal elements are least partially comprised of a heat conductive flexible material being heat conductive silicone, wherein the heat conductive flexible material comprises
  at least one of metal particles, metal fibres, metal powder and/or
  at least one of ceramic particles, ceramic fibres, ceramic powder and/or
  at least one of carbon particles, carbon fibres, carbon powder.

11. The plastics processing roll according to claim 1, wherein each of said plurality of longitudinal elements comprises two parts, each of which comprises an axially extending contact surface, wherein the two parts are attached to each other along the contact surfaces, wherein each of said plurality of fluid ducts is formed by two or three grooves located in the respective contact surfaces of the two parts and complementing one another.

12. The plastics processing roll according to claim 3, wherein each of said plurality of longitudinal elements comprises two parts, each of which comprises an axially extending contact surface and the two parts are attached to each other along the contact surfaces, wherein each of said plurality of fluid ducts is formed by two or three grooves located in the respective contact surfaces of the two parts and complementing one another.

13. The plastics processing roll according to claim 10, wherein each of said plurality of longitudinal elements comprises two parts, each of which comprises an axially extending contact surface, wherein the two parts are attached to each other along the contact surfaces, wherein each of said plurality of fluid ducts is formed by two or three grooves located in the respective contact surfaces of the two parts and complementing one another.

14. The plastics processing roll according to claim 11, wherein the two parts comprise a radially inner part located radially closer to the rigid inner cylinder and radially outer part located radially farther from the rigid inner cylinder, wherein one of said two or three grooves comprises a larger volume than a complementary groove and is located in the radially outer part, and/or wherein the radially outer part consists of heat conductive flexible material with a thermal conductivity from 1.4 W/mK to 10 W/mK.

15. The plastics processing roll according to claim 13, wherein the two parts comprise a radially inner part located radially closer to the rigid inner cylinder and radially outer part located radially farther from the rigid inner cylinder, wherein one of said two or three grooves comprises a larger volume than a complementary groove and is located in the radially outer part, and/or wherein the heat conductive flexible material of the radially outer part has a thermal conductivity from 1.4 W/mK to 10 W/mK.

16. The plastics processing roll according to claim 1, wherein an intermediate layer is arranged between the rigid cylinder and the flexible liner and is made of a material having an elastic modulus larger than the elastic modulus of a material of the flexible liner but smaller than the elastic modulus of the material of the rigid cylinder.

17. The plastics processing roll according to claim 16, wherein the plurality of longitudinal elements are glued onto the intermediate layer.

18. The plastics processing roll according to claim 3, wherein an intermediate layer is arranged between the rigid cylinder and the flexible liner and is made of a material having an elastic modulus larger than the elastic modulus of a material of the flexible liner but smaller than the elastic modulus of the material of the rigid cylinder.

19. The plastics processing roll according to claim 10, wherein an intermediate layer is arranged between the rigid cylinder and the flexible liner and is made of a material having an elastic modulus larger than the elastic modulus of a material of the flexible liner but smaller than the elastic modulus of the material of the rigid cylinder.

20. The plastics processing roll according to claim 1, further comprising a plurality of longitudinal ribs, wherein each of said plurality of longitudinal elements has at least one longitudinal rib of the plurality of longitudinal ribs facing the rigid inner cylinder or an intermediate layer arranged between the rigid inner cylinder and the flexible liner and is made of a material having an elastic modulus larger than an elastic modulus of a material of the flexible liner but smaller than an elastic modulus of a material of the rigid cylinder, wherein the rigid inner cylinder or the intermediate layer provide corresponding grooves, each of said grooves being designed to receive one of said plurality of longitudinal ribs.

21. The plastics processing roll according to claim 3, further comprising a plurality of longitudinal ribs, wherein each of said plurality of longitudinal elements has at least one longitudinal rib of the plurality of longitudinal ribs facing the rigid inner cylinder or an intermediate layer arranged between the rigid inner cylinder and the flexible liner and is made of a material having an elastic modulus larger than an elastic modulus of a material of the flexible liner but smaller than an elastic modulus of a material of the rigid cylinder, wherein the rigid inner cylinder or the intermediate layer provide corresponding grooves, each of said grooves being designed to receive one of said plurality of longitudinal ribs.

22. The plastics processing roll according to claim 11, further comprising a plurality of longitudinal ribs, wherein each of said plurality of longitudinal elements has at least one longitudinal rib of the plurality of longitudinal ribs facing the rigid inner cylinder or an intermediate layer arranged between the rigid inner cylinder and the flexible liner and is made of a material having an elastic modulus larger than an elastic modulus of a material of the flexible liner but smaller than an elastic modulus of a material of the rigid cylinder, wherein the rigid inner cylinder or the intermediate layer provide corresponding grooves, each of said grooves being designed to receive one of said plurality of longitudinal ribs.

23. The plastics processing roll according to claim 1, wherein said rigid inner cylinder comprises a heat dissipation system.

24. The plastics processing roll according to claim 9, wherein said rigid inner cylinder comprises a heat dissipation system comprising at least one fluid channel extending parallel to a roll axis under an outer shell surface of said rigid inner cylinder.

25. The plastics processing roll according to claim 11, wherein said rigid inner cylinder comprises a heat dissipation system comprising at least one fluid channel extending parallel to a roll axis under an outer shell surface of said rigid inner cylinder.

26. The plastics processing roll according to claim 20, wherein said rigid inner cylinder comprises a heat dissipation system comprising at least one fluid channel extending parallel to a roll axis under an outer shell surface of said rigid inner cylinder.

27. The plastics processing roll according to claim 1, wherein the elastic metal sleeve
has a thickness ranging from 0.1 mm to 1 mm, and/or
has an outer diameter of 200 mm to 650 mm, and/or
consists of nickel or nickel based alloys.

28. The plastics processing roll according to claim 11, wherein the elastic metal sleeve
has a thickness ranging from 0.1 mm to 1 mm, and/or
has an outer diameter of 200 mm to 650 mm, and/or
consists of nickel or nickel based alloys.

29. The plastics processing roll according to claim 20, wherein the elastic metal sleeve
has a thickness ranging from 0.1 mm to 1 mm, and/or
has an outer diameter of 200 mm to 650 mm, and/or
consists of nickel or nickel based alloys.

30. The plastics processing roll according to claim 1, wherein an outer shell surface of the elastic metal sleeve
is anti-stick coated, and/or
has at least one portion showing a defined surface roughness and/or a defined surface structure, wherein said portion is grinded, polished, and/or lapped or said portion has a laser engraved surface.

31. The plastics processing roll according to claim 11, wherein an outer shell surface of the elastic metal sleeve
is anti-stick coated, and/or
has at least one portion showing a defined surface roughness and/or a defined surface structure, wherein said portion is grinded, polished, and/or lapped or said portion has a laser engraved surface.

32. The plastics processing roll according to claim 1, wherein the rigid inner cylinder comprises a hollow cylindrical body and at least one solid insert with a housing portion, non-rotatably housed in the hollow cylindrical body, and a shaft portion extending outwards along a roll axis having a smaller diameter than the diameter of the housing portion, wherein the inflow duct and the outflow duct are provided in the shaft portion.

33. The plastics processing roll according to claim 32, wherein the shaft portion comprises radial bores extending from a shell surface of the shaft portion to the inflow duct and the outflow duct, respectively.

34. The plastics processing roll according to claim 32, wherein the shaft portion comprises an axial flange located in a plane spanned by the axial end of the hollow cylindrical body, being fluid-tight attached to the hollow cylindrical body using an annular cover.

35. The plastics processing roll according to claim 34, wherein the annular cover is screwed to the flange and the hollow cylindrical body.

36. A plastic processing device, comprising at least one rigid metal roll and at least one deformable roll with a number of fluid ducts being fluidically connected to a hydrothermal conditioning unit, wherein the at least one rigid metal roll and the at least one deformable roll are arranged parallely, wherein the at least one deformable roll is a plastics processing roll according to claim 1.

37. The plastic processing device according to claim 36, wherein the rigid metal roll and the deformable roll are kinematically coupled.

38. A method for producing a double-sided structured plastic film (P), using a plastic processing device according to claim 37, wherein the rigid metal roll and the deformable roll have corresponding surface structurings, the method comprising the steps of:
(a) angularly arranging the elastic metal sleeve according to a predefined parameter depending on the actual kinematic coupling of the rigid roll and the deformable roll,
(b) pressurizing the fluid using the hydrothermal conditioning unit up to a predefined pressure,
(c) radially expanding the fluid ducts and the flexible liner of the deformable roll under influence of the predefined pressure, thus
(d) friction-locking the elastic metal sleeve on the flexible liner,
(e) providing and feeding of at least partially molten plastic between the rolls,
(f) squeezing of a plastic material between the two rolls and imprinting the predefined surface structuring of the rolls on both sides of the plastic material,
(g) cooling of an object obtained by step (f) and obtaining the double sided structured plastic film (P).

* * * * *